US012731058B2

(12) United States Patent
Lachance-Quirion et al.

(10) Patent No.: US 12,731,058 B2
(45) Date of Patent: Sep. 8, 2026

(54) GENERALIZED TRANSMON RESET METHOD AND MULTIMODE QUANTUM COMPUTING SYSTEM USING SAME

(71) Applicant: Nord Quantique inc., Sherbrooke (CA)

(72) Inventors: Dany Lachance-Quirion, Sherbrooke (CA); Marc-Antoine Lemonde, Sherbrooke (CA); Jean Olivier Simoneau, Sherbrooke (CA); Julien Camirand Lemyre, Sherbrooke (CA); Philippe St-Jean, Sherbrooke (CA)

(73) Assignee: Nord Quantique Inc., Sherbrooke (CA)

( * ) Notice: Subject to any disclaimer, the term of this patent is extended or adjusted under 35 U.S.C. 154(b) by 693 days.

(21) Appl. No.: 18/177,482

(22) Filed: Mar. 2, 2023

(65) Prior Publication Data

US 2024/0005191 A1 Jan. 4, 2024

Related U.S. Application Data

(60) Provisional application No. 63/346,486, filed on May 27, 2022.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
None
See application file for complete search history.

(56) References Cited

U.S. PATENT DOCUMENTS

2019/0005403 A1* 1/2019 Blais ...................... H10N 60/12
2022/0269970 A1* 8/2022 Zhou ...................... G06N 10/20
2024/0303520 A1* 9/2024 Wang ..................... G06N 10/40

OTHER PUBLICATIONS

International Search Report for corresponding PCT Application No. PCT/CA2023/050276 issued Jun. 6, 2023.
Written Opinion for corresponding PCT Application No. PCT/CA2023/050276 issued Jun. 6, 2023.
Zhou et al., “Rapid and Unconditional Parametric Reset Protocol for Tunable Superconducting Qubits”, Nat Commun 12, 5924 (2021). https://doi.org/10.1038/s41467-021-26205-y.
Feedback Control of a Solid-State Qubit Using High-Fidelity Projective Measurement, Ristè et al., Phys. Rev. Lett. 109, 240502, 2012.

(Continued)

*Primary Examiner* — Samuel D Fereja
(74) *Attorney, Agent, or Firm* — Stratford Group Ltd.

(57) ABSTRACT

Described are various embodiments of a generalized transmon reset method and multimode quantum computing system using same that allow to unconditionally reset a transmon qubit to a ground state thereof even in the presence of excitations in one or more additional modes from a secondary quantum subsystem coupled to the transmon qubit. In one example, the method includes optimizing a circuit quantum electrodynamics (cQED) system to render a f0g1 reset unconditional by: minimizing an amplitude of a dispersive shift between the secondary quantum subsystem and the transmon qubit; and minimizing a reset duration. Additional steps include performing a f0g1 reset, wherein the f0g1 reset may be done simultaneously or sequentially.

20 Claims, 8 Drawing Sheets

(56) References Cited

OTHER PUBLICATIONS

"Fast and Unconditional All-Microwave Reset of a Superconducting Qubit", Magnard et al., Phys. Rev. Lett. 121, 060502, 2018.
"Pulsed Reset Protocol for Fixed-Frequency Superconducting Qubits", Egger et al., Phys. Rev. App. 10, 044030, 2018.
"Fast Universal Control of an Oscillator with Weak Dispersive Coupling to a Qubit", Eickbusch et al., 10.48550/ARXIV.2111.06414, 2021.
"Quantum information processing with superconducting circuits: a review", Wendin, 10.48550/arXiv.1610.02208, 2017.
"Encoding a qubit in an oscillator", Gottesman et al., 10.48550/arXiv.quant-ph/0008040, 2001.

* cited by examiner

GENERALIZED TRANSMON RESET METHOD AND MULTIMODE QUANTUM COMPUTING SYSTEM USING SAME

CROSS-REFERENCE TO RELATED APPLICATIONS

This application claims priority to U.S. Provisional Patent Application No. 63/346,486, filed May 27, 2022, which is hereby incorporated by reference in its entirety.

FIELD OF INVENTION

The present disclosure relates to circuit quantum electrodynamics (cQED) quantum computing systems, and, in particular, to a generalized unconditional transmon reset method and multimode quantum computing system using same.

BACKGROUND

Bosonic codes provide a promising route for hardware-efficient quantum computing when compared with traditional approaches using few-level systems as qubits. The larger number of levels in bosonic systems provides room for redundancy within a single physical system, enabling one to perform quantum error correction at the single-qubit level, something impossible with a two-level system qubit. Furthermore, the dominant source of noise in most physical implementations of harmonic oscillators is photon loss, a type of error for which bosonic codes can be made tolerant to first order. Superconducting circuits is an important platform for bosonic codes due to the possibility of engineering desired interactions between an ancillary nonlinear resource (like a transmon, for example) necessary to encode, read out and correct the bosonic codes in high-quality harmonic modes of a microwave cavity. Indeed, without the ancillary nonlinear resource, only classical states can be created in harmonic oscillators using a coherent microwave source.

In addition, such high-quality harmonic oscillator modes controlled by a sufficiently strong non-linear element have proven valid candidates for bringing to life the visionary proposal of Gottesman, Kitaev and Preskill in 2001, the well-known GKP codes. This approach is gaining interest thanks to recent experiments demonstrating a significant increase in coherence time of those individual qubits through active error correction schemes. This was achieved using devices consisting of a high Q-factor high-purity aluminum microwave resonator cavity controlled by a transmon ancilla coupled to the cavity mode, providing the required non-linear element.

In addition, resetting a transmon qubit to a predetermined state following a quantum computation (usually the ground state) is necessary for quantum computing in general, and particularly in quantum error correction. The easiest method to achieve such a reset in superconducting circuits is to use the natural relaxation of the circuit to its ground state. However, this method becomes unpractical when the relaxation time is much longer than the computation time, which is necessary to perform faithful quantum computation. In other words, the better the qubit is, the longer the relaxation-based reset takes, which is not reasonable tradeoff.

An alternative method is to perform a quantum nondemodulation measurement of the qubit state and change the state of the qubit if and only if the qubit is measurement in an excited state (see for example "Feedback Control of a Solid-State Qubit Using High-Fidelity Projective Measurement", Risté et al., Phys. Rev. Lett. 109, 240502, 2012). This method has the drawback of being complex in terms of hardware, requiring one i) to get a signal out of the dilution fridge, ii) to process the signal to discriminate the qubit state, iii) to send back a control pulse to the fridge conditional on the qubit state, and, finally, iv) resume the computation. A fast (i.e., much faster than the relaxation time of the qubit) and autonomous (i.e., without feedback) reset is therefore highly desirable.

There are known protocols and optimization methods for a fast and autonomous reset for the specific case of a transmon coupled to a dissipative resonator. For example, these include the f0g1 reset protocols, including the simultaneous f0g1 reset protocol of Magnard et al. (see "Fast and Unconditional All-Microwave Reset of a Superconducting Qubit", Magnard et al., Phys. Rev. Lett. 121, 060502, 2018), or the original pulsed or sequential f0g1 reset protocol of Egger et al. (see "Pulsed Reset Protocol for Fixed-Frequency Superconducting Qubits", Egger et al., Phys. Rev. App. 10, 044030, 2018). The concept of this so-called f0g1 reset is to effectively transfer a potential excitation of the transmon qubit to an auxiliary resonator. If the lifetime of the resonator is much shorter than the relaxation time of the qubit, one gets back to the ground state of the system on a smaller timescale than simply through relaxation of the qubit alone.

The key ingredient of a f0g1 reset is to activate an effective exchange of energy between the second excited state of the transmon (state $|f\rangle$) in the absence of photons in the resonator (state $|0\rangle$, combined state being $|f0\rangle$) and the ground state of the transmon (state $|g\rangle$) with a single photon in the resonator (state $|1\rangle$, combined state being $|g1\rangle$), hence the f0g1 name. This effective interaction, turned on through a microwave drive on the system at the appropriate frequency, sends an excitation in the second excited state of the transmon (state $|f\rangle$) back to the ground state (state $|g\rangle$). To also reset the transmon in the presence of a population in the first excited state (state $|e\rangle$), an additional drive is used to drive oscillations between the $|e\rangle$ and $|f\rangle$ transmon states (called ef drive hereafter). Combined with the resonator relaxation from the $|g1\rangle$ state to the $|g0\rangle$ state, the protocol takes any excitation in either $|e0\rangle$ or $|f0\rangle$ states to the $|g0\rangle$ state, as desired. In the case of a simultaneous f0g1 reset protocol, both an ef drive and a f0g1 drive are applied simultaneously and their frequencies are selected to be resonant with the $|e0\rangle \leftrightarrow |f0\rangle$ and $|f0\rangle \leftrightarrow |g1\rangle$ transitions, respectively. In the case of a sequential f0g1 reset procedure, the same principles apply but instead of driving both the $|e0\rangle \rightarrow |f0\rangle$ transition and the $|f0\rangle \rightarrow |g1\rangle$ transition simultaneously, the pulses are sent sequentially, one after the other, to avoid driving both transitions at the same time.

FIGS. 1A and 1B show schematic energy level diagrams illustrating the f0g1 reset protocol. FIG. 1A shows how the f0g1 reset protocol enables one to transfer an excitation in the first or second excited state of the transmon to its ground state on a timescale limited only by the relaxation rate of a coupled auxiliary resonator. FIG. 1B shows how the f0g1 reset is made possible through an effective exchange interaction between $|f0\rangle$ and $|g1\rangle$ states are enabled by a microwave drive resonant with the $|f0\rangle \leftrightarrow |g1\rangle$ transition. Combined with the relaxation of the resonator from $|g1\rangle$ to $|g0\rangle$ and a microwave drive resonant with the $|e0\rangle \leftrightarrow |f0\rangle$ transition, any population in either $|e0\rangle$ or $|f0\rangle$ states is transferred to the $|g0\rangle$ state, as desired.

This background information is provided to reveal information believed by the applicant to be of possible relevance.

No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure to delineate their scope beyond that which is explicitly or implicitly described by the following description and claims.

A need exists for a generalized transmon reset method and multimode quantum computing system using same that allows to unconditionally reset a transmon qubit even in the presence of excitations in one or more additional modes coupled to the transmon qubit.

In accordance with a first aspect, there is provided a method for optimizing a multimode circuit quantum electrodynamics (cQED) system comprising a transmon qubit that allows for unconditionally resetting the transmon qubit to a ground state thereof, the multimode cQED system further comprising, operably coupled to said transmon qubit, at least one resonator and at least one secondary quantum subsystem operable to provide one or more additional modes thereto, the method comprising the steps of: minimizing an amplitude of a dispersive shift between the secondary quantum subsystem and the transmon qubit; and minimizing a reset duration.

In one embodiment, the method further includes the step of: minimizing one or more transient excitations in said transmon qubit.

In one embodiment, the secondary quantum subsystem is a three-dimensional superconducting microwave cavity operable to host therein the one or more additional modes, and wherein said transmon qubit is used as an ancilla qubit.

In one embodiment, multiphoton states in the one or more additional modes are used to encode bosonic codes therewith.

In one embodiment, the bosonic codes include one of: Gottessman-Kitaev-Preskill (GKP) codes, cat codes or binomial codes.

In one embodiment, minimizing the amplitude of the dispersive shift is done, at least in part, by reducing a capacitive coupling ($g/27\pi$) between the transmon qubit and the one or more additional modes of the secondary quantum subsystem.

In one embodiment, minimizing the amplitude of the dispersive shift is done, at least in part, by increasing a frequency difference between: the frequencies of a $|g\rangle \leftrightarrow |e\rangle$ and a $|e\rangle \leftrightarrow |f\rangle$ transitions of the transmon qubit; and the frequency of the additional modes of the secondary quantum subsystem.

In one embodiment, the method further comprises, during operation of the multimode cQED system, the steps of: performing a f0g1 reset procedure on said transmon qubit via a driving hardware operably coupled to the transmon qubit to reset the transmon qubit to the ground state thereof, the f0g1 reset procedure comprising the steps of: during said reset duration: driving an $|e\rangle \leftrightarrow |f\rangle$ transition in said cQED system; and driving a $|f0\rangle \leftrightarrow |g1\rangle$ transition in said cQED system; and waiting a designated wait time for the cQED system to relax from a $|g1\rangle$ state to a $|g0\rangle$ state.

In one embodiment, the f0g1 reset procedure is a simultaneous f0g1 reset procedure wherein said driving an $|e\rangle \leftrightarrow |f\rangle$ transition, and said driving a $|f0\rangle \leftrightarrow |g1\rangle$ transition is done simultaneously for said reset duration.

In one embodiment, the f0g1 reset procedure is a sequential f0g1 reset procedure wherein said driving an $|e\rangle \leftrightarrow |f\rangle$ transition, and said driving a $|f0\rangle \leftrightarrow |g1\rangle$ transition is done one after the other.

In one embodiment, the sequential f0g1 reset procedure is repeated two or more times until a reset error is smaller than a designated threshold.

In one embodiment, before performing said f0g1 reset procedure a first time, a re-optimization procedure is executed, the re-optimization procedure comprising the steps of: 1) performing a first calibration f0g1 reset procedure to determine: a first frequency and a first amplitude of a first microwave drive for driving the $|e\rangle \leftrightarrow |f\rangle$ transition; and a second frequency and a second amplitude of a second microwave drive for driving the $|f0\rangle \leftrightarrow |g1\rangle$ transition; 2) updating said first frequency to maximize a probability of having the transmon qubit in the ground state upon a subsequent f0g1 reset procedure being completed; 3) updating said second frequency so as to maximize a probability of having the transmon qubit in the ground state upon the subsequent f0g1 reset being completed; 4) updating the second amplitude so as to maximize a probability of having the transmon qubit in the ground state upon the subsequent f0g1 reset being completed; 5) repeating in sequence steps 2), 3) and 4) until said first frequency, said second frequency and said second amplitude each change by less than to a corresponding designated threshold value; and wherein said performing said f0g1 procedure is done using the subsequent f0g1 reset procedure having the updated first frequency, updated second frequency and updated second amplitude.

In one embodiment, minimizing the reset duration is done, at least in part, by maximizing a bandwidth of a first microwave drive configured to drive said e-f transition, and a bandwidth of a second microwave drive configured to drive said f0-g1 transition.

In one embodiment, maximizing a bandwidth of the first microwave drive and the bandwidth of the second microwave drive is done, at least in part, via pulse shaping.

In accordance with a second aspect, there is provided a multimode circuit quantum electrodynamics (cQED) system, the multimode cQED system comprising: a cQED circuit device comprising: a transmon qubit; a resonator operably coupled to the transmon qubit; a secondary quantum subsystem operably coupled to the transmon qubit, and configured to provide one or more additional modes to the cQED circuit device; and a driving hardware comprising one or more microwave generators operably coupled to said transmon qubit and to the secondary quantum subsystem and operable to provide one or more microwave drives thereto; a measuring hardware operably coupled to the resonator of the cQED circuit device; and a controller operably coupled to said driving hardware and to said measuring hardware, the controller comprising a processor coupled to a memory; wherein said cQED circuit device is configured so that the amplitude of a dispersive shift between the secondary quantum subsystem and the transmon qubit is minimized; and wherein the memory comprises instructions that, when executed by the processor, causes the processor, during operation of the cQED system, to: execute a f0g1 reset procedure to reset the transmon qubit to a ground state thereof using a minimized reset duration.

In one embodiment, the secondary quantum subsystem is a three-dimensional superconducting microwave cavity operable to host therein the one or more additional modes, and wherein said transmon qubit is used as an ancilla qubit.

In one embodiment, multiphoton states in the one or more additional modes are used to encode bosonic codes.

In one embodiment, the bosonic codes include one of: Gottessman-Kitaev-Preskill (GKP) codes, cat codes or binomial codes.

In one embodiment, the amplitude of the dispersive shift is minimized, at least in part, by increasing a frequency difference between: the frequencies of a $|g\rangle \leftrightarrow |e\rangle$ transition and an $|e\rangle \leftrightarrow |f\rangle$ transition of the transmon qubit; and the frequency of the additional modes of the secondary quantum subsystem.

In one embodiment, the reset duration of said f0g1 reset procedure is minimized, at least in part, by maximizing a bandwidth of a first microwave drive generated by said one or more microwave generators configured to drive an $|e\rangle \leftrightarrow |f\rangle$ transition, and a bandwidth of a second microwave drive generated by said one or more microwave generators configured to drive a $|f\rangle \leftrightarrow |g1\rangle$ transition.

Other aspects, features and/or advantages will become apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figures 1A, 1B:
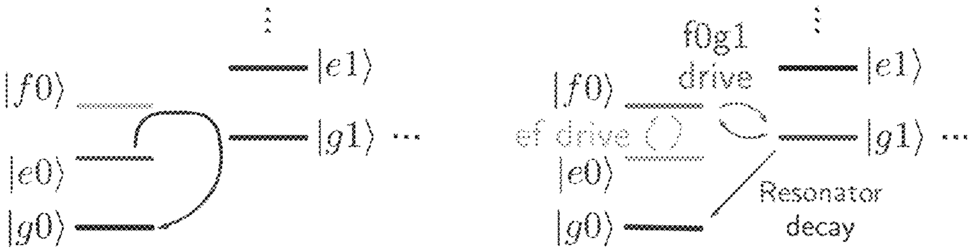
FIGS. 1A and 1B are schematic diagrams of energy transitions used in a transmon reset protocol, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z. (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples of a generalized transmon reset method in a multimode quantum computing system. Despite the currently known f0g1 reset protocols (e.g. simultaneous or sequential) meeting the requirements of a fast and autonomous reset protocol for superconducting transmon qubits, they become invalid in the presence of additional modes dispersively coupled to the transmon when these additional modes contain excitations. Generally, the additional modes may be provided by quantum mechanically coupling the transmon qubit to any other quantum mechanical system known in the art. Thus, in a non-limiting example, the additional modes may take the form of cavity modes generated using a three-dimensional superconducting microwave cavity. These cavities are often used to implement bosonic codes and use the transmon qubit as an auxiliary resource.

When these additional modes contain excitations, the transition frequencies of the f0g1 and of drives required to execute the reset procedure will depend on the presence of excitations in the additional modes, making the reset conditional on the states of the additional modes. Another related issue is that the reset procedure dephases the states in the additional modes. Indeed, if the transmon qubit is in either the first or second excited state during the reset process, its state will evolve stochastically (due to the resonator relaxation) back to the ground state, effectively randomizing the phase (i.e. dephasing) of the states in the additional modes. This is a great limitation when considering the use of the f0g1 reset for bosonic codes, in which the transmon (or transmon qubit) is used as an ancillary resource for encoding, reading out and performing error corrections of a bosonic code state in a cavity mode. Thus there is a need for a generalized unconditional reset method for multimode architectures. Using the generalized reset method for the ancillary transmon qubit discussed herein, unconditional reset (simultaneous or sequential) may be achieved even in the presence of excitations in additional modes, such as those in a superconducting cavity coupled to the transmon qubit.

Figure 2:
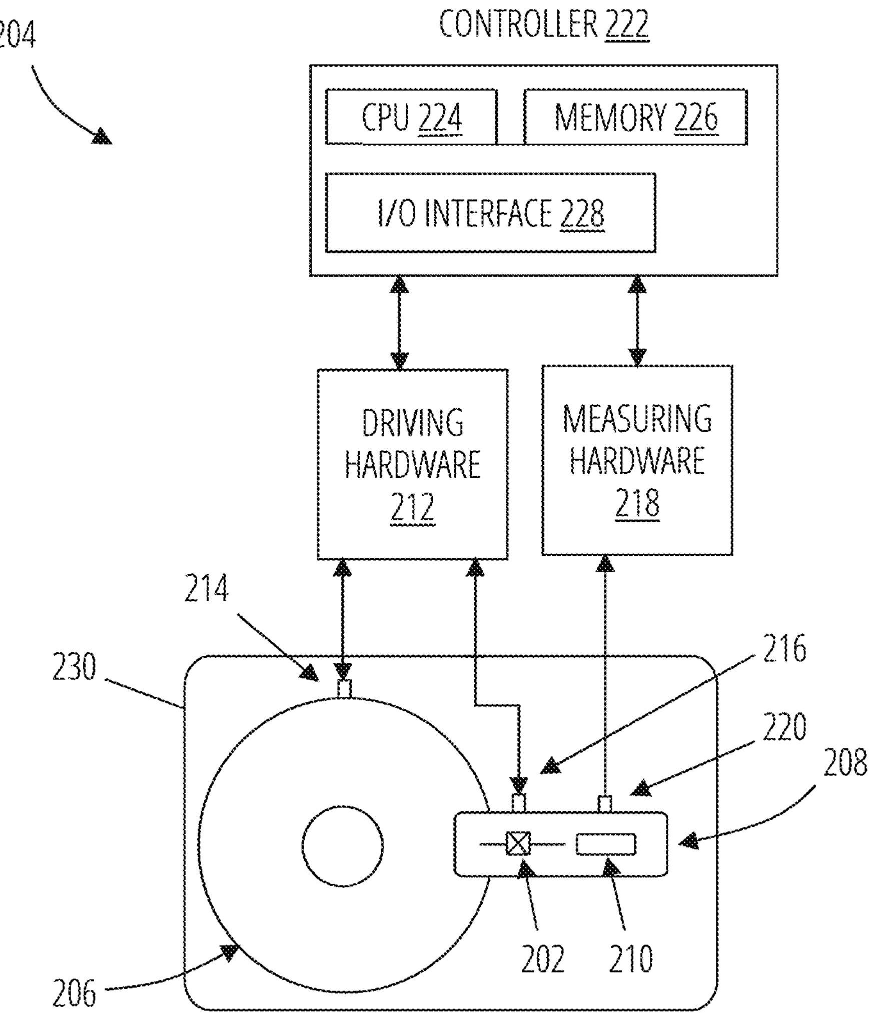
FIG. 2 is a schematic diagram of an exemplary circuit quantum electrodynamics (cQED) system for quantum computing, in accordance with one embodiment.

As an example only, FIG. 2 shows a schematic diagram of an exemplary circuit quantum electrodynamics (cQED) system 204 that can be used to implement bosonic codes in a multimode architecture. In this example, the system 204 comprises a three-dimensional (3D) superconducting microwave cavity 206 configured to provide long-lived microwave modes with a rotation-symmetric electric field. This can include for example a seamless coaxial-type superconducting microwave cavity or the like, although other types of superconducting cavities may be considered as well.

The cavity 206 is operably coupled to an ancilla resource 208 via one or more microwave waveguides. The ancilla resources 208 comprise an ancilla transmon 202 (also sometime referred to as the transmon qubit) operably coupled to a linear readout resonator 210. They are used as auxiliary resources for encoding, reading out and performing error corrections of a bosonic code state in a cavity mode. In addition, in the context of the transmon reset method discussed further below, the readout resonator 210 may also be used as an auxiliary resonator to perform the reset procedure. However, the skilled person in the art will understand that additional resonators may be coupled to the system 204, without limitation. For example, in some embodiments, a dedicated reset resonator may be used. In addition, different types of resonators known in the art may be considered, including for example one or more Purcell filtered resonators. While in the example herein, the 3D cavity 206 provides the additional modes discussed above and below, it will be understood that any other types of quantum systems that are quantum mechanically coupled to the transmon 202 and resonator 210 could also be used to provide the additional modes discussed herein and can equally be used to execute the generalized unconditional reset method discussed below, without exception. In some embodiments, bosonic codes such as GKP codes may be encoded in the fundamental mode of the coaxial cavity 206, wherein the cavity 206 is dispersively coupled to the ancilla or auxiliary transmon qubit 202. The ancilla transmon 202 may also be dispersively coupled to the on-chip resonator 210 used for ancilla readout and reset. In addition, the combination of the cavity 206 with the ancilla resource 208 may readily be integrated as a single superconducting circuit device 230.

The driving hardware 212 typically comprises one or more microwave generators and for example an arbitrary waveform generator (AWG) or other configured to generate coherent microwave drives and pulses. These may be used for example to prepare or initialize the transmon in a given state using control pulses. In some embodiments, at least one microwave generator is used to generate an e-f drive for driving the e and f state transitions, and another to generate the f0g1 drive for driving the f0g1 transition. However, other embodiments can use a single microwave generator multiplexed to drive both transitions. The one or more generators are typically coupled via one or more transmission lines to the cavity 206 using the cavity control port 214 and to the ancilla resource 208—and thus the transmon 202 and the resonator 210—using the ancilla control port 216. The measuring hardware 218 is used to read out the state of the transmon 202. Thus, the measuring hardware 218 typically comprises one or more analog-to-digital converters (ADC) configured to detect and measure microwave signals or tones scattered off the read-out resonator 210 (via a readout port 220). The skilled person in the art will understand that different hardware variations and/or techniques may be used to perform the qubit readout, without limitation. It will also be understood that conventional or typical hardware components, such as amplifiers, band-pass filters, up or down converters, or others, may also be included in the driving hardware 212 and the measuring hardware 218, without limitations.

Both the driving hardware 212 and the measuring hardware 218 are coupled to a controller 222. The controller 222 is typically provided in the form of a classical computer, which comprises one or more classical processors 224 coupled to a memory 226 and an input/output interface 228. The controller 222 and the driving hardware 212 are used to control and measure states in the superconducting circuit device 230 to implement therewith bosonic codes or qubits, and control logical operations therewith.

In addition, not illustrated in FIG. 2 is a well-known cooling hardware used to maintain the superconducting components, namely the superconducting cavity 206 and the transmon 202, at near-zero Kelvin temperatures. Different means of cooling these components at near-zero Kelvin temperatures may be used, without limitations. In contrast, the driving hardware 212, measuring hardware 218 and controller 222, or parts thereof, are typically operated at various higher temperatures.

The skilled person in the art will understand that the exemplary superconducting circuit system 204 of FIG. 2 is only used as an example to better illustrate the method discussed below. The skilled person in the art will appreciate that other types of quantum computing systems may be used as well. These may include, for example, any superconducting quantum processors based on transmon qubits controlled with microwave drives sent to the transmon qubits through microwave transmission lines. The states of the transmon qubits can be read out by readout resonators coupled to one or more transmon qubits.

In addition, while the system 204 is shown only comprising a single superconducting circuit device 230, other systems may comprise one or more such superconducting circuit devices, of which some may be operatively coupled to each other to increase the number of bosonic qubits thereof. Thus, the reset method described herein may be applied to each such superconducting circuit devices individually, and a single controller 222 may be used to control the resets for multiple coupled devices.

As discussed above, proper operation of any system using a multimode architecture, such as system 204 of FIG. 2, requires a working unconditional reset procedure or method for the ancillary transmon 202. The shortcomings of the traditional f0g1 reset methods (simultaneous and sequential) in the context of a multimode system can be quantified by defining the phase accumulated in an additional mode during the reset procedure due to a change in the state of the transmon. For the first and second excited states, we have:

$$\Delta\varphi_e = \chi \int_0^{T_{reset}} p_e(t)dt \quad (1)$$

$$\Delta\varphi_f = 2\chi \int_0^{T_{reset}} p_f(t)dt \quad (2)$$

where $\chi$ is the dispersive interaction strength, $p_{e,f}(t)$ are the time-dependent probabilities of the transmon being in the first excited state $|e\rangle$ or second excited state $|f\rangle$, $T_{reset}$ is the duration of the reset.

If the additional mode contains no excitations, the dephasing has no consequence. It is therefore useful to define the effective accumulated phase as:

$$\varphi_{eff} = \bar{n}(\Delta\varphi_e + \Delta\varphi_f) \quad (3)$$

where the $\bar{n}$ is the average number of excitations in the additional mode. Equation 3 above provides guidelines in order to limit the conditionality of the reset:

1. If possible, avoid excitations in the additional modes (minimize $\bar{n}$). This is of course not always possible, especially in an architecture for bosonic codes encoded in multiphoton states in one or more additional modes.
2. Reduce the amplitude of the dispersive shift as much as possible (minimize $|\chi|$). This is further discussed below in the section title "Challenges of the multimode f0g1 reset specific for bosonic codes" below. If not required, the dispersive interaction (also called static ZZ interaction in other architectures) can be minimized through careful microwave design. If required, the dispersive interaction should be nevertheless minimized.
3. Reduce the duration of the f0g1 reset as much as possible (minimize $T_{reset}$). This applies to the simultaneous and the sequential reset protocols equally. In the original f0g1 reset protocol, the reset duration has a lower bound set to three times the relaxation time of the lossy resonator. Below we provide a way to bypass this constraint.
4. Minimize the transient qubit excitations (minimize $p_{e,f(t)}$).

Characterization of the Reset Conditionality (with Example)

The present section shows different quantum state tomography plots illustrating exemplary experimental data that demonstrate the improved performance of the guidelines as discussed above. For a given multimode system, the skilled person in the art will appreciate that one can evaluate the conditionality of the f0g1 reset on the qubit by directly performing tomography of the transmon qubit or indirectly performing tomography of an additional cavity mode by using the transmon as a tomography tool. In both cases, the state of the transmon after the reset contains information on whether the reset method or procedure was successful or not.

Here we provide an exemplary list of experiments one can perform to evaluate the conditionality of the reset. The first three experiments serve as sanity checks. The experiments are:

1. Prepare the transmon in the ground state, prepare the additional mode in the vacuum state, perform the reset, and measure the transmon and/or the additional mode. The transmon should be in the ground state and the mode in the vacuum state;
2. Prepare the transmon in the excited state, prepare the additional mode in the vacuum state, perform the reset, and measure the transmon and/or the additional mode. The transmon should be in the ground state if the f0g1 reset works and the mode in the vacuum state;
3. Prepare the transmon in the ground state, prepare the additional mode in a coherent state, perform the reset, and measure the transmon and/or the additional mode. The transmon should be in the ground state and the mode in a coherent state of the same amplitude provided the relaxation of the mode during the reset is negligible; and
4. Prepare the transmon in the excited state, prepare the additional mode in a coherent state, perform the reset, and measure the transmon and/or the additional mode. The transmon should be in the ground state if the f0g1 reset works despite the excitations in the additional mode. The mode should be in a coherent state of the same amplitude provided the relaxation of the mode during the reset is negligible. The difference in the phase of the coherent states between experiments #3 and #4 is proportional to $\Delta_{\varphi_e}$ and $\Delta_{\varphi_f}$.

Figures 3A, 3B, 3C, 3D:
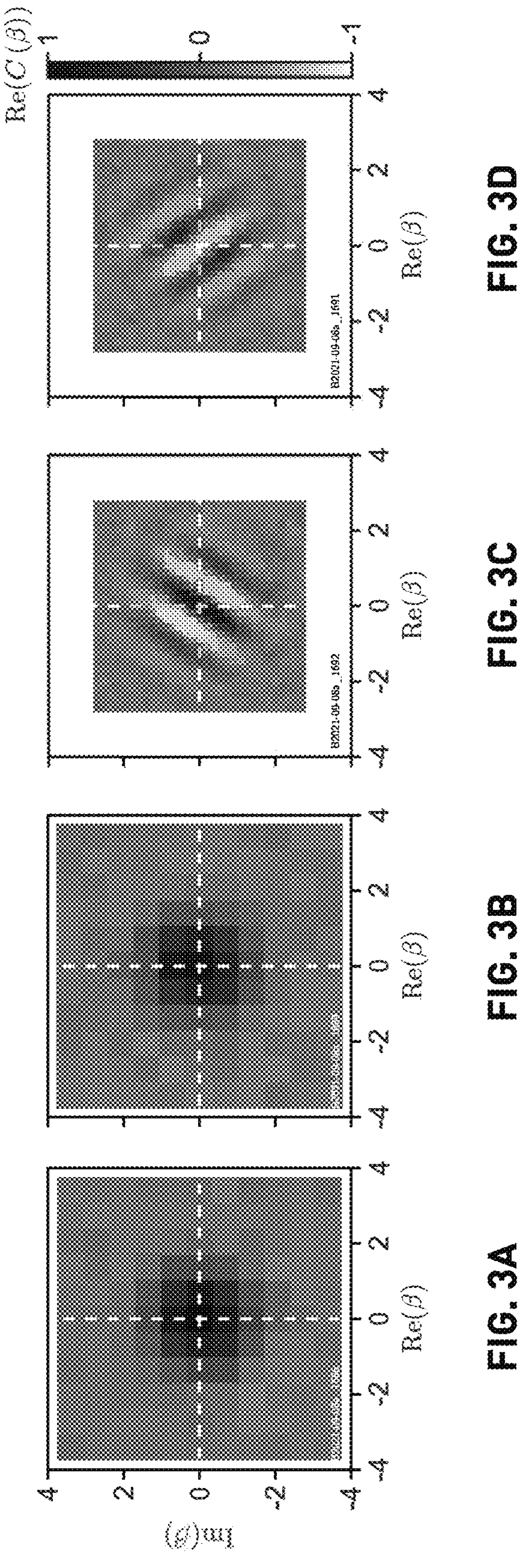
FIGS. 3A to 3D are various quantum state tomography plots illustrating the conditionality of the traditional transmon reset protocol, in accordance with one embodiment.
Figures 4A, 4B, 4C, 4D:
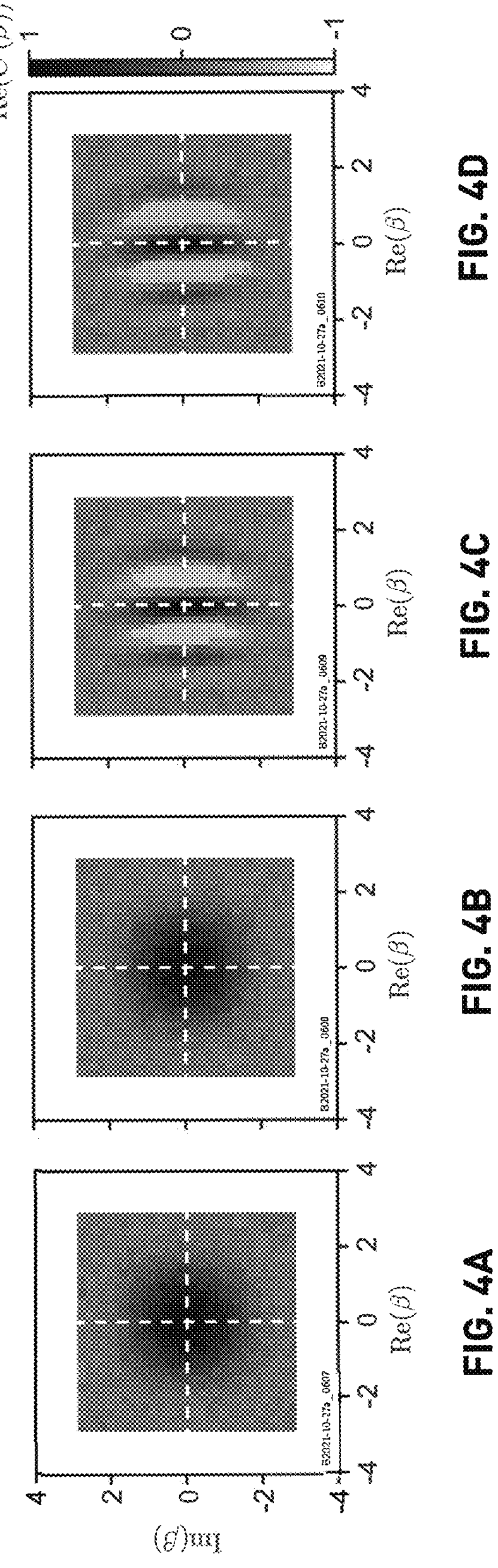
FIGS. 4A to 4D are various quantum state tomography plots illustrating the unconditionality of a generalized simultaneous transmon reset protocol, in accordance with one embodiment.

FIGS. 3A to 3D show exemplary tomography measurements corresponding to experiments #1, #2, #3 and #4, respectively, in which the simultaneous f0g1 reset protocol as currently known in the art has been used in presence of $\bar{n}$=5.92 photons in an additional mode. FIG. 3A shows a characteristic function of the vacuum state with the transmon in the ground state following a reset. FIG. 4B shows the same but with the transmon initially in the excited state. Without the reset, the measurement would be inverted (white instead of black). However, because the reset properly works in these conditions, the measurement is not inverted (black, as desired). FIG. 3C shows the same type of measurement as in FIG. 3A, but with a coherent state in the cavity mode, as evidenced by the presence of fringes in the characteristic function. The angle of the fringes is a signature of the rotation of the state during the reset process. FIG. 3D shows the same measurement as shown in FIG. 3B but starting with the transmon in the excited state. Here we see that the measurement is indeed still inverted despite the reset being applied, an indication of a faulty reset. Note that the rotation of the state is in the opposition direction as in FIG. 3C, indicating that this is a conditional rotation, a source of dephasing. Thus, FIGS. 3C and 3D clearly show that the f0g1 reset procedure as currently known in the art fails in such a case.

In contrast, FIGS. 4A to 4D show similar plots as those of FIGS. 3A to 3D, but this time using the improved simultaneous f0g1 reset method in a multimode system as discussed above. FIG. 4A shows a characteristic function of the vacuum state with the transmon in the ground state following a reset. FIG. 4B shows the same but starting the transmon in the excited state. Without the reset, the measurement would be inverted (white instead of black). However, because the reset properly works in these conditions, the measurement is not inverted (black, as desired). FIG. 4C shows the same as FIG. 4A, but with a coherent state in the cavity mode, as evidenced by the presence of fringes in the characteristic function. FIG. 4D shows the same as FIG. 4C but starting with the transmon in the excited state. Here we see that the measurement is not inverted, an indication of a successful reset.

Table 1 below summarizes the parameters for both sets of experiments:

TABLE 1

| FIGS. | Reset duration $T_{reset}$ (ns) | Dispersive shift amplitude $\|\chi\|/2\pi$ (kHz) | Mode population $\bar{n}$ |
|---|---|---|---|
| 3A-3D | 1500 | 52.6 | 5.92 |
| 4A-4D | 300 | 5.97 | 4.22 |

In some embodiments, the unconditional transmon reset method described herein may have additional steps or variations thereof. Non-limiting and non-exclusive examples of such variations and/or additional steps are discussed below.

Re-Optimization Procedure

In some embodiments, if the f0g1 reset methods (e.g., simultaneous, or sequential) may be used in the presence of a known finite population in some additional mode, it is possible to reoptimize the f0g1 reset parameters in the presence of the finite population in the mode. Here it is assumed that the f0g1 drive frequency and amplitude and of drive frequency and amplitudes are initially optimized according to the original f0g1 reset protocols. Then, one may:

1. Update the optimal $|f0\rangle \leftrightarrow |g1\rangle$ frequency by maximizing the probability of having the qubit in the ground state after the reset.
2. Update the optimal $|e\rangle \leftrightarrow |f\rangle$ frequency in an equivalent manner.
3. Update the optimal $|g\rangle \leftrightarrow |e\rangle$ amplitude in an equivalent manner.
4. Repeat steps 1) to 3) until convergence.

In some embodiments, step 1 above may be realized by first sweeping the frequency of the f0g1 drive, and then measuring the probability of the transmon qubit being in the ground state thereof when preparing the system in the second excited state $|f\rangle$. An optimal f0g1 drive frequency may be found when this probability is maximized. The other steps 2 and 3 may be done in a similar manner. The readout signal corresponding to the system being in the $|g\rangle$ state may be measured when the system is idle, i.e. when no pulses are sent to the system except the readout pulse. Thus, when the qubit is prepared in the $|f\rangle$ state, and the f0g1 drive is applied, the system is tuned so as to recover the signal calibrated as corresponding to the system being in the $|g\rangle$ state. The skilled person in the art will appreciate that the actual values of those frequencies may depend on the specific embodiment of the cQED system.

This procedure enables one to automatically consider a shift in the f0g1 and of frequencies due to the population in the additional mode. As opposed to the default calibration procedure, it is also possible to obtain off-resonant drives that maximize the fidelity of the reset. The original calibration procedure (e.g., the original f0g1 reset—simultaneous or sequential) is however still useful to provide an initial seed to the calibration procedure.

Swap-and-Wait Optimization Method

The original f0g1 reset method known in the art sets a lower bound on the reset duration to three times the relaxation time of the lossy resonator. This lower bound comes from the requirement of the final state being the transmon in the ground state $|g\rangle$ and the resonator in the vacuum state $|0\rangle$, combined state $|g0\rangle$). However, one can see that as soon as the system is in state $|g1\rangle$, the additional modes do not suffer from dephasing. This reset method, referred to as the swap-and-wait f0g1 reset method, therefore consists of splitting the f0g1 reset procedure in two distinct parts:

1. The first part involves using the f0g1 and ef drives to bring the system from $|e0\rangle$ or $|f0\rangle$ states to the $|g1\rangle$ state. The duration of this first part should be minimized and is not limited by the relaxation time of the resonator.
2. The second part involves waiting for the relaxation of the resonator bringing the system from the g1 state to the g0 state.

In the end, the swap-and-wait method can be used to reduce the dephasing that an additional mode suffers during the reset.

Increased Bandwidth Through Pulse Shaping

In some embodiments, reducing the duration of the f0g1 and ef drives compared with the default f0g1 reset protocol is equivalent to an increase in the bandwidth of these drives. An increased bandwidth is beneficial as it increases the robustness of the drives to a dispersion caused by finite populations in the additional modes. Once the duration of the drives is minimized, the bandwidth can furthermore be increases through pulse shaping. For example, modulating the envelopes of the pulses with a sinc function can be used to control the bandwidth of the pulses for a fixed pulse duration.

Challenges of the Multimode f0g1 Reset Specific for Bosonic Codes

In general, when decreasing the amplitude of the dispersive interaction between the cavity mode and the transmon to avoid a conditionality of the reset, there exist a trade-off between the dispersive interaction strength and the duration of the protocol. This trade-off can be somewhat surpassed by using echoed conditional displacements (ECD—see for example "Fast Universal Control of an Oscillator with Weak Dispersive Coupling to a Qubit", Eickbusch et al., 10.48550/ARXIV.2111.06414, 2021), a universal control method for bosonic codes in which the duration of the operations can be made, to some extent, independent of the amplitude of the dispersive interaction. When using ECDs, however, brightstating is a mechanism that brings back the trade-off between the dispersive interaction strength and the duration of the protocol. The brightstating phenomenon can be described as when the transmon gets spontaneously excited to a very high energy state in the presence of a very strong drive on a coupled mode. Brightstating can therefore be encountered when one tries to compensate the decrease of the amplitude of the dispersive interaction by increasing the amplitude of the drives in the ECDs. Brightstating therefore provides an upper bound on the drive strength of the ECDs, leading to a lower bound on the duration of these ECDs for a given dispersive interaction strength. Saturating the lower upper bound naturally leads to longer ECDs when decreasing the dispersive interaction strength to make the f0g1 reset (simultaneous and sequential) more unconditional.

Another issue encountered when decreasing the amplitude of the dispersive shift is the increased impact of the so-called nonlinear dispersive shift, a higher-order interaction that naturally occurs in a transmon-cavity system. Indeed, a simple calculation shows that the ratio between the nonlinear and linear dispersive shift increases when decreasing the linear dispersive shift to improve the conditionality of the f0g1 reset. In other words, the smaller the dispersive shift is, the strongest the role of the nonlinear dispersive shift is. The impact of the nonlinear dispersive shift is to increase the complexity of the calibration procedure of echoed conditional displacements.

Figure 5:
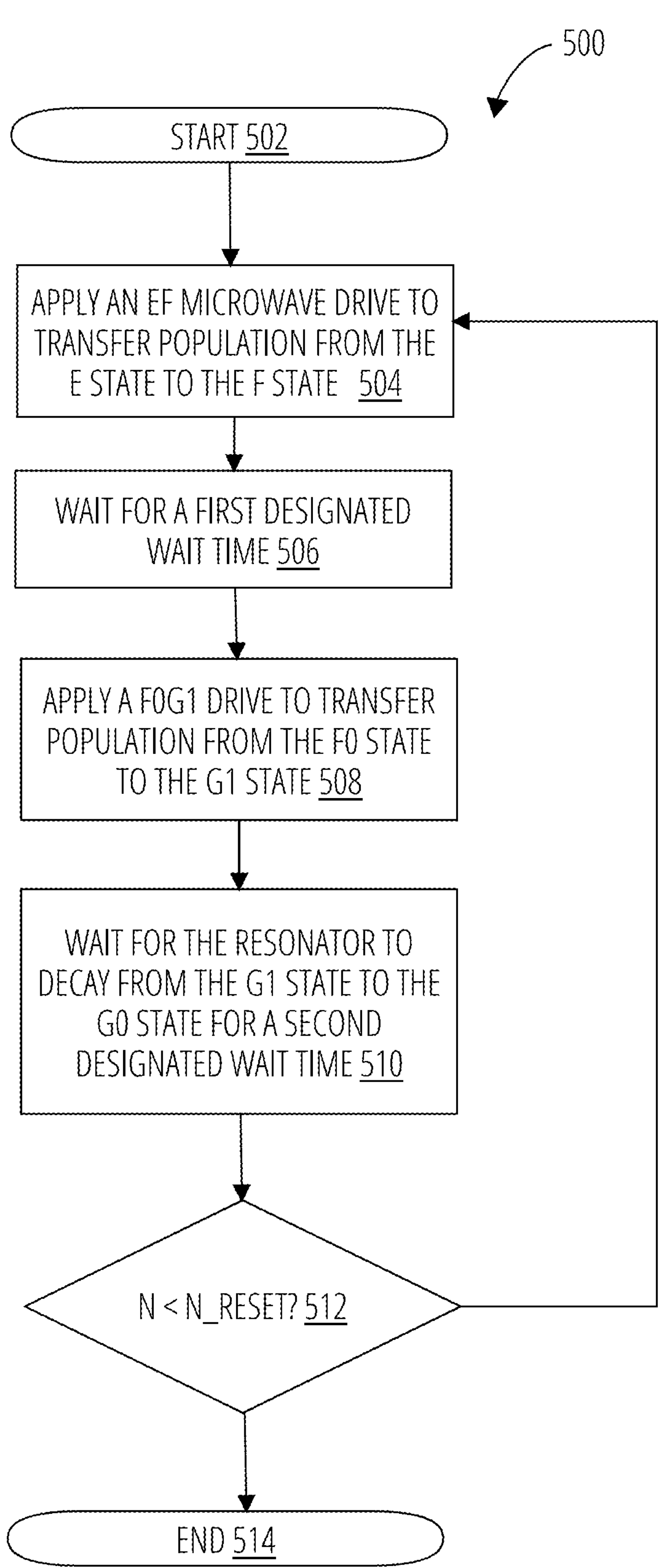
FIG. 5 is a flow diagram illustrating an improved sequential f0g1 reset procedure usable with the method of FIG. 8, in accordance with one embodiment.
Figure 6A:
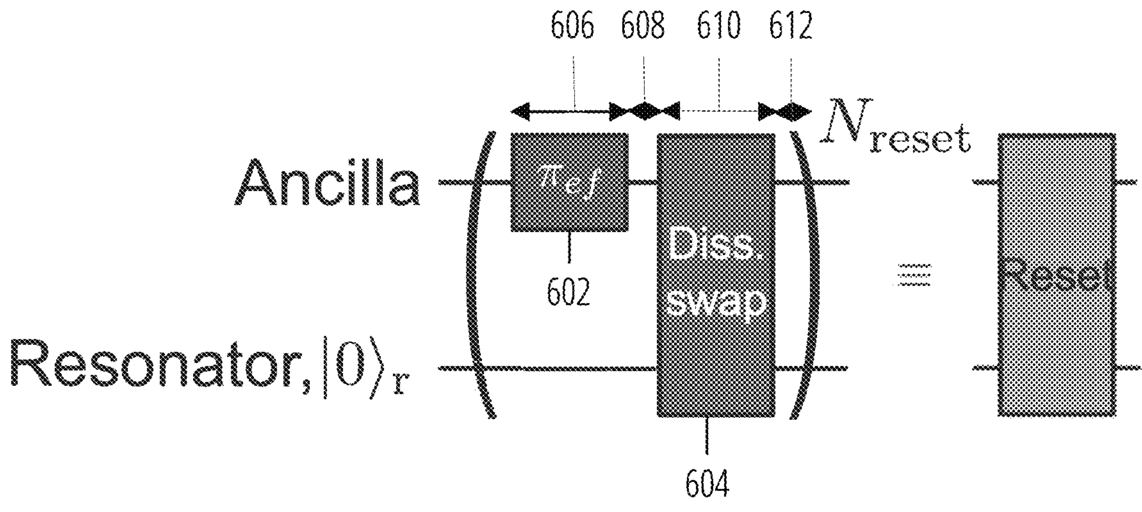
FIGS. 6A and 6B are schematic diagrams illustrating the improved sequential transmon reset procedure of FIG. 5, in accordance with one embodiment.
Figure 6B:
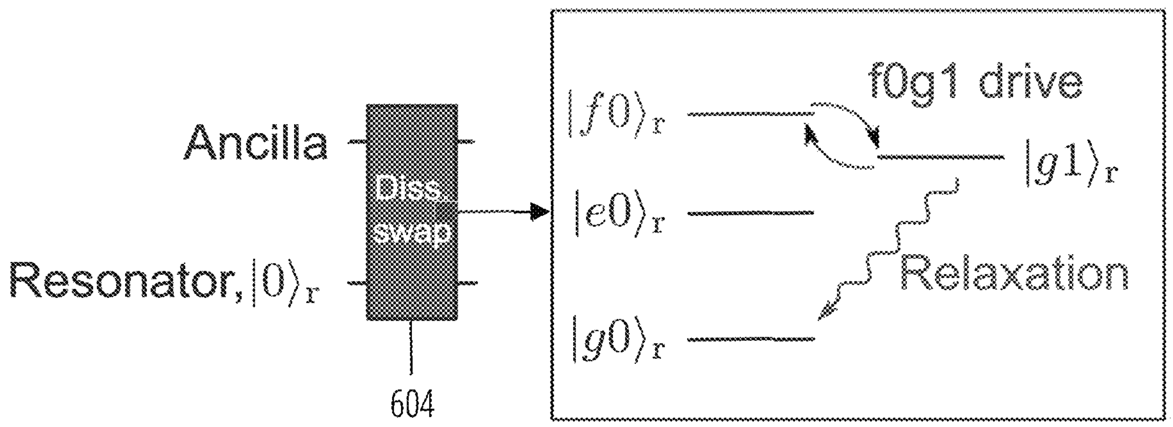

With reference to FIG. 5 and FIGS. 6A and 6B, an exemplary embodiment using a sequential f0g1 reset procedure with a cQED system (such as system 204 of FIG. 2) optimized as described above will now be discussed. FIG. 6A is a schematic diagram illustrating how the system as optimized to render the reset procedure unconditional may also be used with a sequential f0g1 reset protocol, in accordance with one embodiment.

The sequential f0g1 reset protocol described below further includes additional improvements over the original protocol, by applying the sequential reset protocol two or more times in quick succession. In this example, the protocol for the unconditional reset of the auxiliary transmon qubit (e.g., ancilla transmon 202) is again based on swapping the ancilla excitations to the lossy readout resonator (e.g., resonator 210) through the ancilla second excited state, $|f\rangle$. However, instead of applying the resonant microwave pulses (e.g., the ef and f0g1 drives) simultaneously, as discussed above, the drives are applied via the driving hardware 212 sequentially instead to avoid driving both transitions at the same time. Advantageously, this improved sequential f0g1 reset may be repeated multiple times to improve performance or until the reset error is under a designated reset error threshold.

In one embodiment, the improved sequential f0g1 reset method 500 of FIG. 5, schematically illustrated in FIGS. 6A and 6B, starts at step 502. Then, the method comprises the steps of, sequentially:

Step 504: Applying the ef microwave drive (sometimes referred to as a $\pi_{ef}$-pulse 602) at a frequency and amplitude selected to be resonant with the $|e\rangle \leftrightarrow |f\rangle$ transition in the transmon qubit for a designated ef drive duration 606. The amplitude and/or duration 606 of the ef drive is chosen such as to provide a $\pi$ pulse (e.g., that will transfer as completely and perfectly as possible the population from the $|e\rangle$ state to the $|f\rangle$ state).

Step 506: Waiting for a first designated wait time 608.

Step 508: Applying the f0g1 drive at a frequency and amplitude selected to drive the $|f0\rangle \leftrightarrow |g1\rangle$ transition (also referred in FIGS. 6A and 6B as a dissipative swap 604—schematically illustrated in FIG. 6B) for a designated f0g1 drive duration 610. Again, the amplitude and the duration 610 of the f0g1 drive is chosen so as to completely transfer the population from the $|f0\rangle$ state to the $|g1\rangle$ state.

Step 510: Wait for the resonator to decay from the $|g1\rangle$ to the $|g0\rangle$ state for a second designated wait time 612.

Step 512: if the number of times N the reset (e.g., steps 804-810) executed is smaller than $N_{reset}$, repeat steps 504-510 once more. If $N>N_{reset}$, the reset procedure is over (step 514).

The skilled person in the art will appreciate that the ef drive 602 and f0g1 drive (or dissipative swap) 604 may equally be applied using two distinct microwave generators, or via a single multiplexed microwave generator of the driving hardware 212, as mentioned above. In addition, the value of $N_{reset}$ may be selected so that it decreases a reset error below a designated lower threshold value, as will be discussed below.

As noted above, the success of a reset operation can be quantified via a reset error. For example, in one embodiment, we can define the reset error $$\varepsilon_r^i$$

when preparing a state $|i\rangle$ as being equal to the probability of being in an excited state $$p_{exc}^i,$$

then the reset error may be defined as:

$$\varepsilon_r^i = p_{exc}^i = p_e^i + p_f^i = 1 - p_g^i \tag{4}$$

wherein $$p_e^i \text{ and } p_f^i$$

are the probabilities of being in the e or f excited states after one iteration of a reset operation, respectively. Then, the average reset error $\varepsilon_r$ may be defined as the average over the prepared states (here g, e, and f as an example):

$$\varepsilon_r = \left(\varepsilon_r^g + \varepsilon_r^e + \varepsilon_r^f\right)/3. \tag{5}$$

Typically, the average reset error, as defined in eq. 5, is reduced each time a reset (steps 504-510) is applied to the coupled system. Typically, applying steps 504-510 above once (e.g., 1 reset) will reset the population in the first transmon excited state $|e\rangle$, that excitations populating the $|f\rangle$ excited state will require at least two such resets (because the first reset will push the population from the $|f\rangle$ state to the $|e\rangle$ state).

Figure 7A:
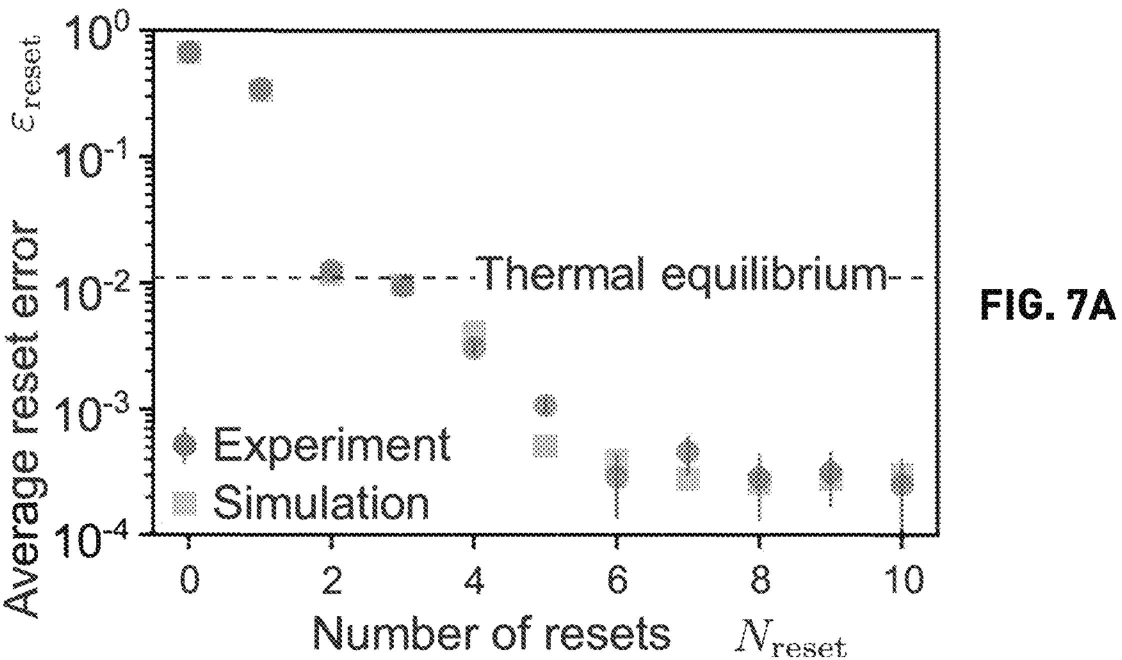
FIGS. 7A and 7B are graphical plots illustrating experimental results showing the change in average reset error $\varepsilon_r$ as a function of number of sequential resets ($N_{reset}$) applied (FIG. 7A) and as a function of the average number of photons of a GKP logical state for a given number of sequential resets ($N_{reset}$) (FIG. 7B), in accordance with one embodiment.
Figure 7B:
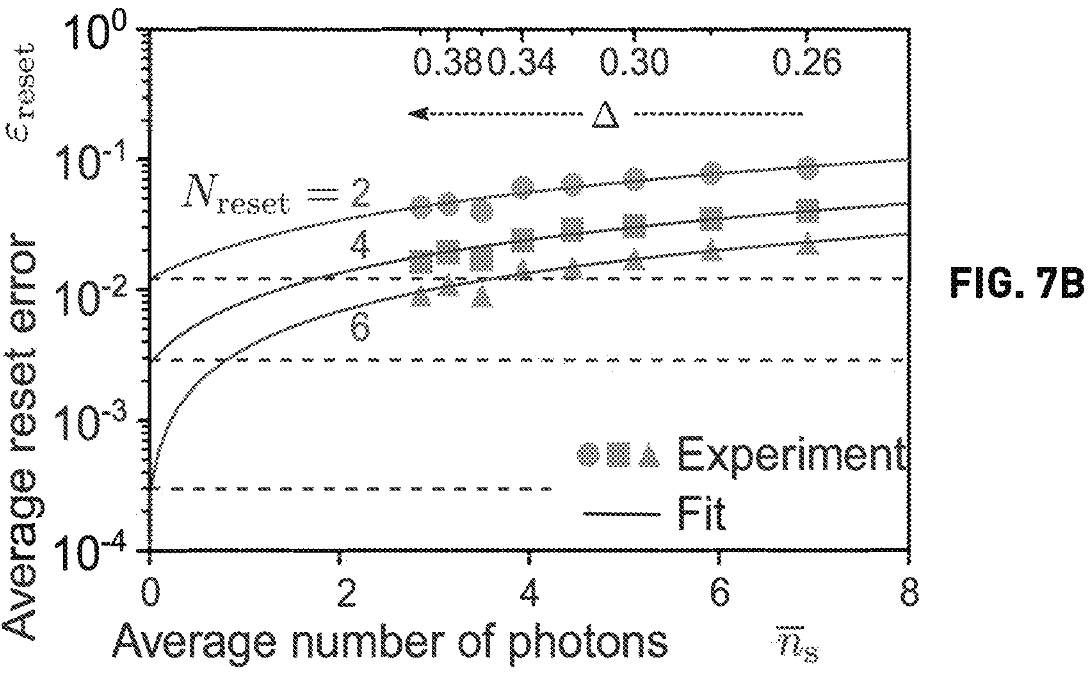

FIG. 7A and FIG. 7B are graphical plots illustrating experimental results showing the change in average reset error $\varepsilon_r$ in the ancilla transmon 202 of the cQED system 204 as a function of number of sequential resets ($N_{reset}$) applied (FIG. 7A) and as a function of the average number of photons of a GKP logical state (FIG. 7B) for a given number of sequential resets ($N_{reset}$). While the present results shown in FIGS. 7A and 7B were measured while hosting GKP states as the bosonic codes in the cQED system 200, the skilled person in the art will understand that the optimizations described above for ensuring unconditionality of the ancillary transmon reset operation apply equally to other bosonic codes that may be encoded in the additional modes of the cavity 206 in the cQED system 200, including for example, without limitation: cat codes and/or binomial codes.

The results shown in FIGS. 7A and 7B were obtained using an of drive duration 606, first designated time period 608, and a f0g1 drive duration 610 of 12 ns, 20 ns and 128 ns, respectively, giving a total drive duration of about 160 ns per reset. The second designated wait time 612 (between resets) used was 60 ns.

FIG. 7A is a plot illustrating the change in the average reset error E r as a function of the number of $N_{reset}$, as measured experimentally (circles). Also shown in FIG. 7A are results obtained from numerical simulations (squares), obtained by solving the Lindblad master equation for pulse-level simulation of open quantum systems—which are in good agreement with the measurements. FIG. 7A clearly shows that the system is below thermal equilibrium after 4 applications of the sequential f0g1 resets 500.

Advantageously, the currently discussed optimizations to render the f0g1 reset unconditional and the improved sequential reset protocol are robust even when the system is hosting bosonic codes, such as GKP states. The change in the average error in the presence of a GKP state may be quantified using the following phenomenological equation:

$$\varepsilon_r = \varepsilon_r^0 + \mathcal{S}\bar{n}_s \tag{6}$$

where $\varepsilon_r$ is the average reset error in the presence of a GKP state, $$\varepsilon_r^0$$

is the average error with the storage mode in the vacuum state, $\mathcal{S}$ is a scaling parameter, and $\bar{n}_S$ is the average number of photons populating the GKP state.

FIG. 7B shows various exemplary experimental plots of the measured average reset error as a function of the average number of photons $\bar{n}_S$ of a GKP logical state (here state $|-X\rangle$ was used as an example only) with GKP finite-energy parameter $\Delta$=0.36 for $N_{reset}$=2 (circles), 4 (squares) and 6 (triangles). In FIG. 7B, the plain line corresponds to a fit to equation 4, while the horizontal dashed lines correspond to the reset error with the storage mode in the vacuum state $|0\rangle$ $$(e.g., \varepsilon_r^0).$$

Table 2 below lists of the values of different parameters of Eq. 6 extracted from the experimental results shown in FIG. 7B:

TABLE 2

| Number of sequential f0g1 resets ($N_{reset}$) | $\varepsilon_r^0$(%) | $\mathcal{S}$(%) | $\varepsilon_r$(%) |
|---|---|---|---|
| 2 | 1.21(2) | 1.09(27) | 3.99 |
| 4 | 0.29(1) | 0.55(11) | 1.77 |
| 6 | 0.03(1) | 0.34 | 0.94 |

Clearly, table 2 above shows how the average reset error is low even with an increasing photon population in the GKP state.

Figure 8:
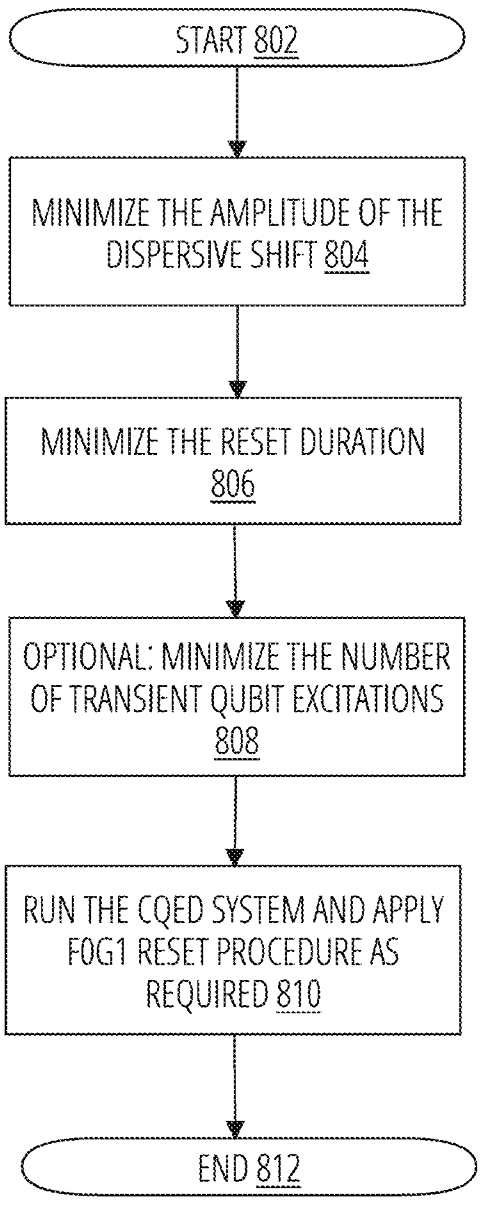
FIG. 8 is a flow diagram illustrating a method of optimization that allows an unconditional f0g1 reset procedure (simultaneous or sequential) to be performed on the cQED system of FIG. 2, in accordance with one embodiment.

Going back to Eq. 3, and in view of the above discussion, the guidelines described may be summarized into an optimization method for allowing to unconditionally apply a f0g1 reset protocol (simultaneous or sequential) to a transmon qubit of a multimode cQED system, such as the transmon 204 of FIG. 2. FIG. 8 is an exemplary flow diagram illustrating such a method 800, in accordance with one embodiment. The skilled person in the art will understand that without this method, as was demonstrated for example in FIGS. 3A-3D, any f0g1 reset procedure used on a transmon in a multimode system would not be unconditional, and thus unworkable to be used for quantum computing applications, such as error correction.

Method 800 starts at step 802, where a multimode cQED system, such as the system 204 of FIG. 2, is typically built or assembled as is known in the art and ready to perform quantum computation therewith. At step 804, the cQED system is configured to minimize the amplitude of the dispersive shift $|X|$. This may be achieved, for example, by reducing the capacitive coupling ($g/2\pi$) between the transmon qubit and the additional modes, and/or by increasing the difference in frequencies between the first two transitions of the transmon qubit 202 (e.g., $|g\rangle \leftrightarrow |e\rangle$ and $|e\rangle \leftrightarrow |f\rangle$) and the additional modes in the cavity 206. As an example, a value of $g/2\pi$~75 MHz and a frequency difference of ~1.5 GHz were used herein. At step 806, which may be done independently of step 804, the multimode cQED system is further configured to minimize the duration of the f0g1 reset protocol to be used thereafter. In some embodiments, this may be achieved by increasing the bandwidth of the of and f0g1 drives. In addition, the duration may further be reduced by using pulse shaping, as discussed above, and modulating the envelopes of the drives or pulses so as to increase the bandwidth of the pulses for a fixed duration. While above pulse shaping via a sinc function was mentioned, other known shaping functions may readily be used as well. Optionally, step 806 may also be done, which includes minimizing the number of transient qubit excitations in the transmon 202. Then, at step 810, the cQED system is used to perform quantum computing operations, and a f0g1 reset procedure (simultaneous or sequential, as discussed above) is used to reset the transmon qubit to the ground state as needed. The method ends at step 812. The skilled person in the art will understand that the configuration or tuning discussed in steps 802, 804 and 806 above can be achieved via tuning the operation of the driving hardware 212 via the controller 222, using known techniques to the skilled person in the art that will not be further discussed herein.

It will be understood that the expression classical or conventional "computer", or "controller", as used herein is not to be interpreted in a limiting manner. "computer" is rather used in a broad sense to generally refer to the combination of some form of one or more processing units and some form of memory system accessible by the processing unit(s). "Controller" is used in a broad sense to generally refer to a device which performs a function of controlling and may be a computer or another type of device. The memory system if a computer can be of the non-transitory type. The use of the expression "computer" in its singular form as used herein includes within its scope the combination of a two or more computers working collaboratively to perform a given function, independently of whether these two or more computers are local, remote, or distributed. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples. The memory system can include a suitable combination of any suitable type of computer-readable memory located either internally, externally, and accessible by the processor in a wired or wireless manner, either directly or over a network such as the Internet.

A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A method for optimizing a multimode circuit quantum electrodynamics (cQED) system comprising a transmon qubit that allows for unconditionally resetting the transmon qubit to a ground state thereof, the multimode cQED system further comprising, operably coupled to said transmon qubit, at least one resonator and at least one secondary quantum subsystem operable to provide one or more additional modes thereto, the method comprising the steps of:

minimizing an amplitude of a dispersive shift between the secondary quantum subsystem and the transmon qubit; and executing a f0g1 reset procedure to reset the transmon qubit to a ground state thereof while minimizing a reset duration.

2. The method of claim 1, further including the step of: minimizing one or more transient excitations in said transmon qubit.

3. The method of claim 1, wherein said secondary quantum subsystem is a three-dimensional superconducting microwave cavity operable to host therein the one or more additional modes, and wherein said transmon qubit is used as an ancilla qubit.

4. The method of claim 3, wherein multiphoton states in the one or more additional modes are used to encode bosonic codes therewith.

5. The method of claim 4, wherein the bosonic codes include one of: Gottesman-Kitaev-Preskill (GKP) codes, cat codes or binomial codes.

6. The method of claim 1, wherein said minimizing the amplitude of the dispersive shift is done, at least in part, by reducing a capacitive coupling ($g/2\pi$) between the transmon qubit and the one or more additional modes of the secondary quantum subsystem.

7. The method of claim 1, wherein said minimizing the amplitude of the dispersive shift is done, at least in part, by increasing a frequency difference between:

the frequencies of a $|g\rangle \leftrightarrow |e\rangle$ and a $|e\rangle \leftrightarrow |f\rangle$ transitions of the transmon qubit; and the frequency of the additional modes of the secondary quantum subsystem.

8. The method of claim 1, wherein executing said f0g1 reset procedure on said transmon qubit is done via a driving hardware operably coupled to the transmon qubit to reset the transmon qubit to the ground state thereof, the f0g1 reset procedure comprising the steps of:

during said reset duration:

driving an $|e\rangle \leftrightarrow |f\rangle$ transition in said cQED system; and driving a $|f0\rangle \leftrightarrow |g1\rangle$ transition in said cQED system; and waiting a designated wait time for the cQED system to relax from a $|g1\rangle$ state to a $|g0\rangle$ state.

9. The method of claim 8, wherein said f0g1 reset procedure is a simultaneous f0g1 reset procedure wherein said driving an $|e\rangle \leftrightarrow |f\rangle$ transition, and said driving a $|f0\rangle \leftrightarrow |g1\rangle$ transition is done simultaneously for said reset duration.

10. The method of claim 8, wherein said f0g1 reset procedure is a sequential f0g1 reset procedure wherein said driving an $|e\rangle \leftrightarrow |f\rangle$ transition, and said driving a $|f0\rangle \leftrightarrow |g1\rangle$ transition is done one after the other.

11. The method of claim 10, wherein said sequential f0g1 reset procedure is repeated two or more times until a reset error is smaller than a designated threshold.

12. The method of claim 8, wherein, before performing said f0g1 reset procedure a first time, a re-optimization procedure is executed, the re-optimization procedure comprising the steps of:

1) Performing a first calibration f0g1 reset procedure to determine:
   - a first frequency and a first amplitude of a first microwave drive for driving the $|e\rangle \leftrightarrow |f\rangle$ transition; and
   - a second frequency and a second amplitude of a second microwave drive for driving the $|f0\rangle \leftrightarrow |g1\rangle$ transition;
2) Updating said first frequency to maximize a probability of having the transmon qubit in the ground state upon a subsequent f0g1 reset procedure being completed;
3) Updating said second frequency so as to maximize a probability of having the transmon qubit in the ground state upon the subsequent f0g1 reset being completed;
4) Updating the second amplitude so as to maximize a probability of having the transmon qubit in the ground state upon the subsequent f0g1 reset being completed;
5) Repeating in sequence steps 2), 3) and 4) until said first frequency, said second frequency and said second amplitude each change by less than to a corresponding designated threshold value; and wherein said performing said f0g1 procedure is done using the subsequent f0g1 reset procedure having the updated first frequency, updated second frequency and updated second amplitude.

13. The method of claim 1, wherein said minimizing the reset duration is done, at least in part, by maximizing a bandwidth of a first microwave drive configured to drive said e-f transition, and a bandwidth of a second microwave drive configured to drive said f0-g1 transition.

14. The method of claim 13, wherein said maximizing a bandwidth of the first microwave drive and the bandwidth of the second microwave drive is done, at least in part, via pulse shaping.

15. A multimode circuit quantum electrodynamics (cQED) system, the multimode cQED system comprising:

a cQED circuit device comprising:
- a transmon qubit;
- a resonator operably coupled to the transmon qubit;
- a secondary quantum subsystem operably coupled to the transmon qubit, and configured to provide one or more additional modes to the cQED circuit device; and
- a controller operably coupled to said driving hardware and to said measuring hardware, the controller comprising a processor coupled to a memory;
- wherein said cQED circuit device is configured so that the amplitude of a dispersive shift between the secondary quantum subsystem and the transmon qubit is minimized; and
- wherein the memory comprises instructions that, when executed by the processor, causes the processor, during operation of the cQED system, to: execute a f0g1 reset procedure to reset the transmon qubit to a ground state thereof using a minimized reset duration.

16. The multimode cQED system of claim 15, wherein said secondary quantum subsystem is a three-dimensional superconducting microwave cavity operable to host therein the one or more additional modes, and wherein said transmon qubit is used as an ancilla qubit.

17. The multimode cQED system of claim 16, wherein multiphoton states in the one or more additional modes are used to encode bosonic codes.

18. The multimode cQED system of claim 17, wherein the bosonic codes include one of: Gottessman-Kitaev-Preskill (GKP) codes, cat codes or binomial codes.

19. The multimode cQED system of claim 15, wherein the amplitude of the dispersive shift is minimized, at least in part, by increasing a frequency difference between:

the frequencies of a $|g\rangle \leftrightarrow |e\rangle$ transition and an $|e\rangle \leftrightarrow |f\rangle$ transition of the transmon qubit; and the frequency of the additional modes of the secondary quantum subsystem.

20. The multimode cQED system of claim 15, wherein said reset duration of said f0g1 reset procedure is minimized, at least in part, by maximizing a bandwidth of a first microwave drive generated by said one or more microwave generators configured to drive an $|e\rangle \leftrightarrow |f\rangle$ transition, and a bandwidth of a second microwave drive generated by said one or more microwave generators configured to drive a $|f0\rangle \leftrightarrow |g1\rangle$ transition.

* * * * *